United States Patent
Haschke

(10) Patent No.: US 7,284,359 B2
(45) Date of Patent: Oct. 23, 2007

(54) BREECH LOADER

(75) Inventor: Eggo Haschke, Deerfield, IL (US)

(73) Assignee: Poly-Clip System Corp., Mundelein, IL (US)

( * ) Notice: Subject to any disclaimer, the term of this patent is extended or adjusted under 35 U.S.C. 154(b) by 0 days.

(21) Appl. No.: 11/153,942

(22) Filed: Jun. 16, 2005

(65) Prior Publication Data

US 2006/0283155 A1 Dec. 21, 2006

(51) Int. Cl.
*B65B 3/14* (2006.01)
*B65B 9/10* (2006.01)

(52) U.S. Cl. ......................................... 53/252; 53/259

(58) Field of Classification Search .................... 53/52, 53/493, 246, 252, 259
See application file for complete search history.

(56) References Cited

U.S. PATENT DOCUMENTS

| | | | | |
|---|---|---|---|---|
| 3,879,920 A | * | 4/1975 | Langen | 53/506 |
| 3,945,171 A | * | 3/1976 | Marietta et al. | 53/79 |
| 4,258,532 A | * | 3/1981 | Dilot | 53/538 |
| 4,627,215 A | * | 12/1986 | Walz | 53/246 |
| 5,241,806 A | * | 9/1993 | Ziegler et al. | 53/566 |
| 5,359,834 A | * | 11/1994 | Holdensgaard et al. | 53/566 |
| 5,560,184 A | * | 10/1996 | Tisma | 53/531 |
| 5,768,854 A | * | 6/1998 | Nannini et al. | 53/252 |
| 5,787,680 A | * | 8/1998 | Tisma et al. | 53/244 |
| 5,797,124 A | * | 8/1998 | Walsh et al. | 704/275 |
| 5,896,728 A | * | 4/1999 | Domino et al. | 53/458 |
| 6,708,742 B2 | * | 3/2004 | Weathers et al. | 141/391 |
| 6,729,102 B2 | * | 5/2004 | Ailey et al. | 53/134.1 |
| 6,912,826 B2 | * | 7/2005 | Momich | 53/252 |
| 6,993,889 B2 | * | 2/2006 | Ford et al. | 53/475 |
| 7,051,495 B2 | * | 5/2006 | Lang et al. | 53/475 |

\* cited by examiner

*Primary Examiner*—Rinaldi I. Rada
*Assistant Examiner*—John Paradiso
(74) *Attorney, Agent, or Firm*—Trexler, Bushnell, Giangiorgi, Blackstone & Marr, Ltd.

(57) ABSTRACT

An apparatus for automatically delivering placed and oriented pieces of meat to a netter for wrapping and netting is described, in which the placement and orientation of the meat pieces remains unchanged from initial placement until final wrapping and netting. The apparatus is a conveyor having a series of compartments in which the meat is placed and oriented. The conveyor is situated below the level of the breech of the feed tube to the netter, so that a compartment carried on said conveyor will be precisely aligned with the opening to the feed tube. A ram pushes the meat pieces out of the compartment and into the feed tube, without changing the placement or orientation of the meat pieces relative to each other. The netter wraps the meat pieces in a collagen film and encases the wrapped meat in a net for further processing.

17 Claims, 3 Drawing Sheets

BREECH LOADER

BACKGROUND OF THE INVENTION

This invention relates to the field of packaging material in nets. More particularly, the invention relates to the field of packaging edible food products, such as hams, in nets. More particularly, this invention relates to the field of packaging material such as hams in shirred, tubular casings and enclosing the products in netting.

Traditionally, meat products were wrapped in netting prior to processing. Removal of the netting after processing, whether by cooking, smoking, curing, aging, or otherwise, often resulted in some of the meat products sticking to the netting and being pulled off during the removal process, leaving an unsightly appearance unpleasant to consumers. Later, the use of edible collagen films solved this problem. Meat products, including sausages and whole-muscle products, are now conventionally enveloped in an edible collagen film. In the prior art, flat sheets of collagen film were turned over plows to form a tubular casing. The meat products are extruded or forced into the casing and the wrapped meat product is then enclosed in a net and the product is further processed. This method and a netting apparatus is described in, for example, U.S. Pat. No. 4,958,477 to Winkler, Apparatus for the Production of Meat Products. A newer method of encasing meat products in tubular collagen film is described in, for example, U.S. patent application Ser. No. 10/695,115, Apparatus and method to net food products in shirred tubular casing. An apparatus for netting products is described in, for example, U.S. Pat. No. 6,883,297 to Kirk, Apparatus for enclosing material in a net.

Some meat products are made of several pieces of whole-muscle meat. Boneless hams, for example, are made by combining several pieces of whole-muscle meat, which usually are irregularly-shaped pieces with one dimension much greater than the other two dimensions. Other types of meat products are made in a similar fashion. In the prior art, the several pieces were placed by hand in, for example, the feed tray (herein, the "breech"), of the netter shown in f the '477 patent. A ram pushes the meat through the guide tube of the netter, and ultimately the meat is wrapped in collagen film, encased in a net, and then processed.

The process of placing the several meat pieces by hand is labor-intensive and time consuming. The process can be automated by bringing the pieces to the feed tray of the netter on a conveyor. The meat must be transferred, however, from the conveyor to the breech of the netter. In one prior art automated system, the conveyor belt is higher than the breech of the netter. Accordingly, the conveyor drops the meat pieces into the breech of the netter. As the meat pieces reach the end of the conveyor, they roll off the end into the feed tray, which is of necessity slightly lower than the conveyor. This rolling disrupts the orientation of the meat.

Placement and orientation of the several meat pieces is important. Most hams will be sliced for use by the consumer, either by a retailer or by the consumer at home. Accordingly, it is the cross-section of the ham that the ultimate consumer sees. Meat packers are trained to arrange the several pieces that will constitute the entire ham to minimize voids within the ham and to create a pleasing appearance once the ham is sliced. Moreover, some consumers want a layer of fat on the outside of the ham, which will retain moisture within the ham and provide flavor during cooking, but can be removed prior to consuming. Accordingly, it is important to place and orient the several meat pieces that will form the ham (or other meat product), and to place and orient the fat layer properly on the several muscles that make up the ham.

Accordingly, a need exists for an apparatus to deliver carefully packed and arranged pieces of meat (and possibly fat) into the feed tray of a netter, without changing the position or orientation of the meat until it has been wrapped and netted. The present invention meets this need.

BRIEF SUMMARY OF THE INVENTION

It is an object of this invention to provide an apparatus that will automatically load pieces of whole-muscle meats (and fat, if necessary) directly into the breech of a netter. It is a further object of this invention to provide an apparatus that will automatically load pieces of whole-muscle meats (and fat, if necessary) without changing the placement or orientation of those pieces relative to each other.

Briefly, and in accordance with the foregoing, the present invention discloses a conveyor having compartments oriented on the belt. The conveyor is oriented to move transversely to the loading direction of a netter, and to be slightly below the height of the breech of the netter, so that the base of the compartments aligns with the breech. Pieces of meat (and fat, if necessary) are placed by hand within a compartment at a loading station. The conveyor then moves transversely to the breech of the netter, aligning the full compartment with the breech and bringing an empty compartment to the loading station. A ram pushes the meat out of the compartment and into the breech. From the time the pieces are placed and oriented in a compartment at a loading station, until they are wrapped and netted upon exit from the netter, they stay in the same position and in the same orientation relative to each other.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE INVENTION

Figure 1:
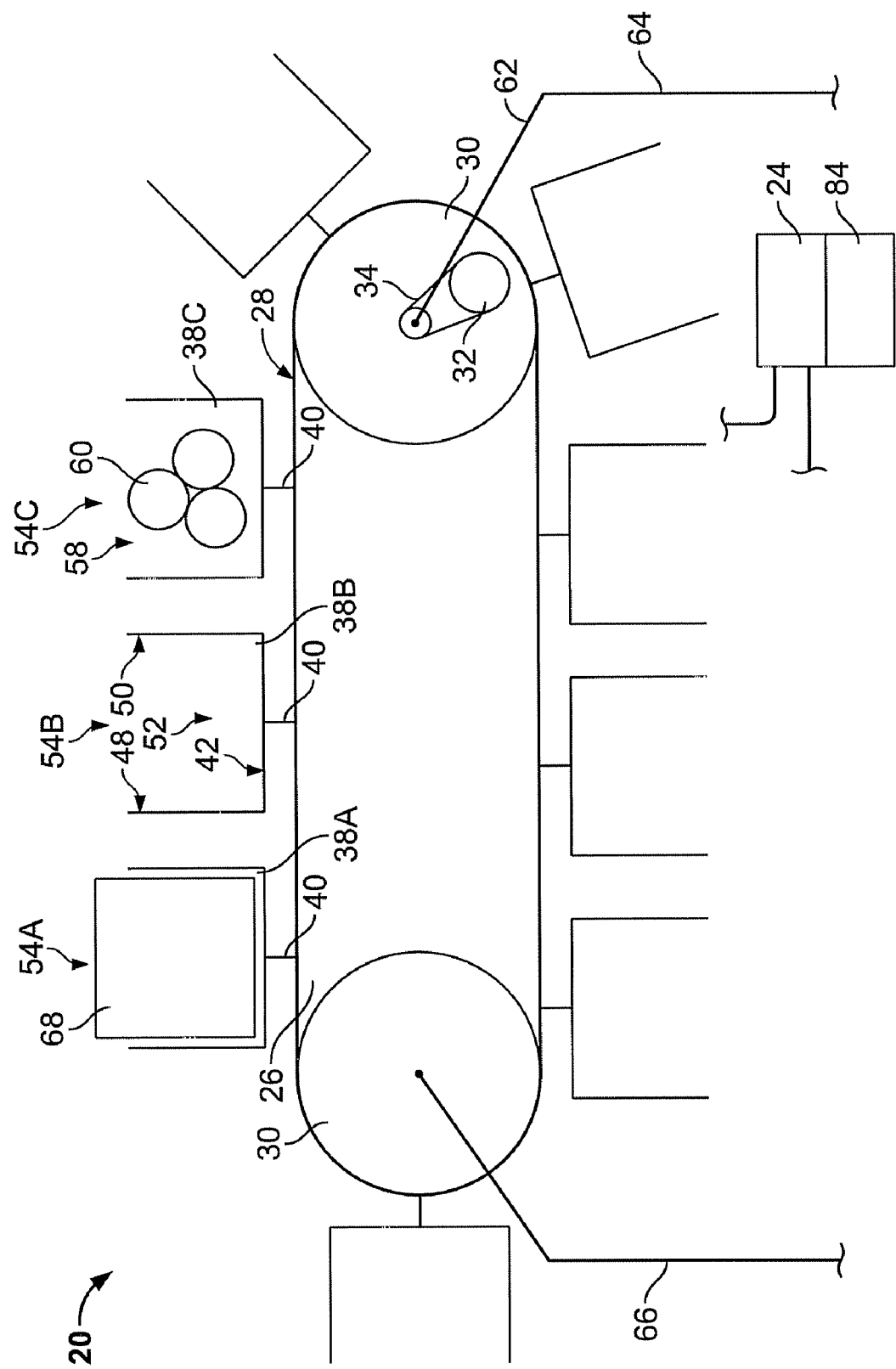
FIG. 1 is a front elevational view of the conveyor system of the preferred embodiment of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 2:
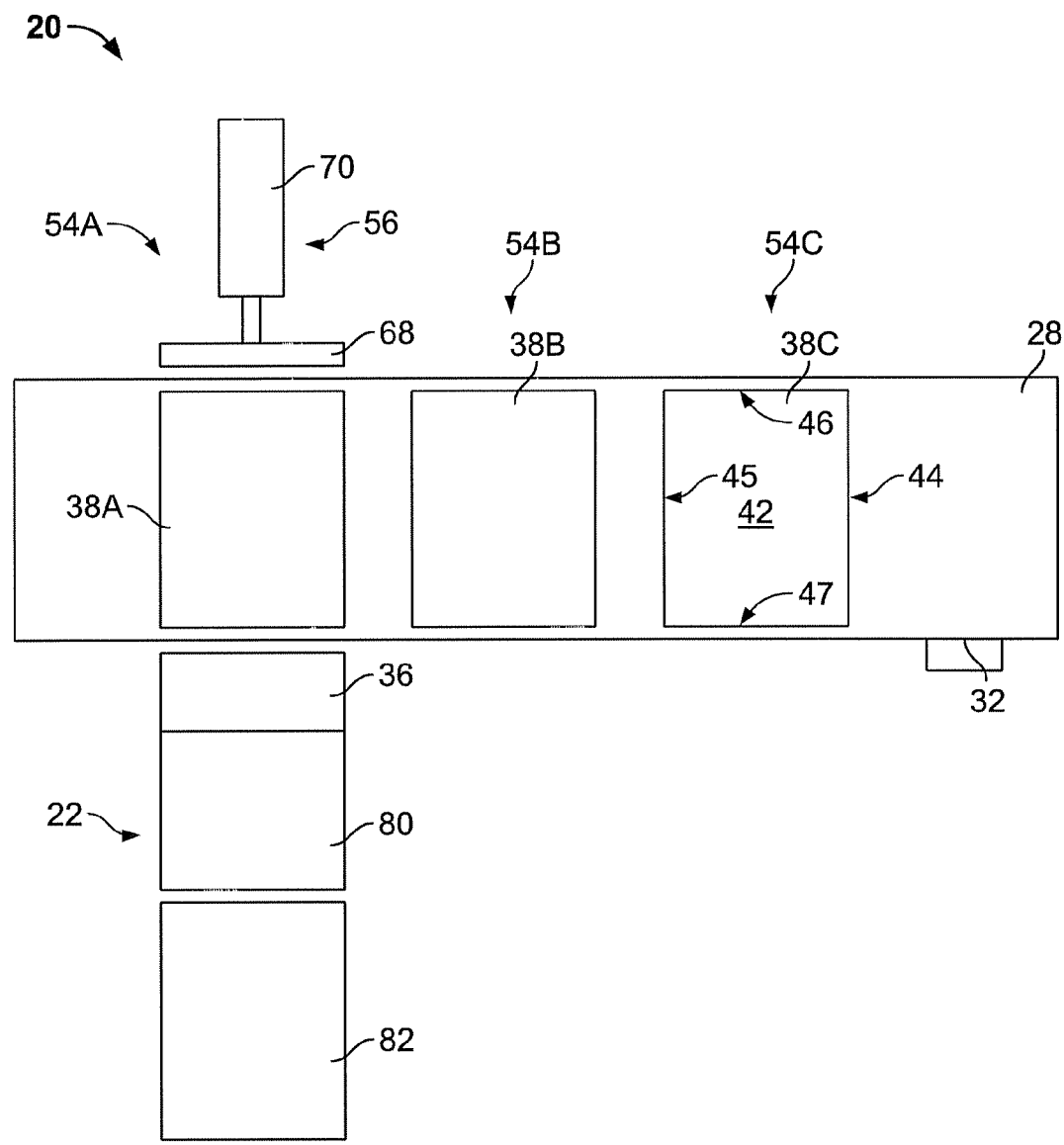
FIG. 2 is a top plan view of the conveyor system of the preferred embodiment of the present invention.
Figure 3:
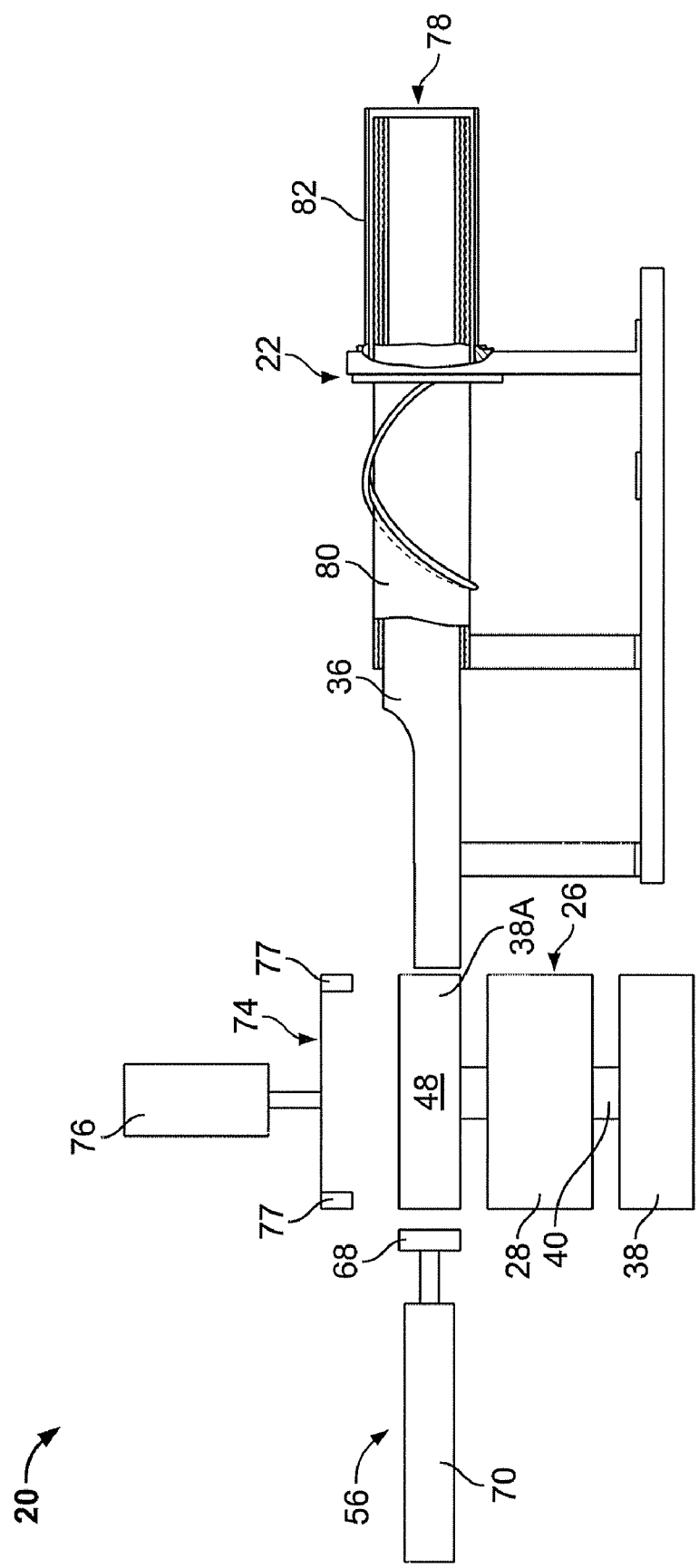
FIG. 3 is a side elevational view of the conveyor system of the preferred embodiment of the present invention.

The breech loader 20 of the preferred embodiment of the present invention is shown in elevation view in FIG. 1, in plan view in FIG. 2, and in side elevation in FIG. 3. Loader 20 is designed for use with a netter 22, such as one described in the prior art referenced above. The moving parts of loader 20 and, preferably, netter 22 are controlled by a programmed logic controller, PLC 24.

Loader 20 has a conveyor 26, which has a belt 28 oriented on a plurality of rollers 30. An electric motor 32 attaches to one roller 30 through a chain 34 to drive the conveyor 26 which, in the orientation shown in FIG. 1, moves in a counterclockwise direction. The direction of travel of conveyor 26 is transverse to the direction of feed to the breech 36 (feed tube or tray) of netter 22.

A series of compartments 38A, 38B, 38C, etc., are attached to belt 28 by respective brackets 40. Each compartment 38 is spaced from the adjacent compartments, at least enough to prevent interference as the compartments 38 travel along the conveyor 26. Each compartment 38 has a generally rectangular base 42, with sides 44, 45, 46, and 47. Two side walls 48, 50 project from two opposing sides 44, 45 of base 42 and are transverse to the direction of travel of conveyor 26. Base 42 and side walls 48, 50 accordingly define a space 52 within each compartment 38 which is open on the two remaining sides 46, 47 of base 42, those sides 46, 47 being parallel to the direction of travel of conveyor 26.

As shown in FIGS. 1 and 2, the three compartments 38A, 38B, and 38C are positioned at stations 54A, 54B, and 54C. As the belt 28 turns in a counterclockwise direction, compartment 54C, for example, will move from station 54C to station 54B and then to station 54A. After the unloading operation at station 54A, as will be explained, a compartment 38 moves around and under conveyor 26, empty, until it arrives again at station 54C.

A ram 56 is positioned transverse to the direction of travel of belt 28 at station 54A and strokes co-axially with the direction of feed to breech 36. When a compartment 38 (as illustrated, compartment 38A) arrives at station 54A, it is in alignment with the ram 56 and a breech 36, as will be explained. The ram 56 is then activated to push the contents of compartment 38 (in the preferred embodiment, composite meat 58 that has been packed into compartment 38, as will be explained) into breech 36. In the meantime, two workers are hand-loading pieces 60 of whole muscle and portion of whole muscle and, if desired, fat, into compartments 38B and 38C at stations 54B and 54C.

Thus, as illustrated, two compartments, 38B and 38C, are being loaded at loading stations 54B and 54C, as ram 56 pushes the composite meat 58 of compartment 38A into netter 22. It is the inventor's experience that the hand-loading steps at stations 54B and 54C take more time than the feed step at station 54A, so multiple loading stations are illustrated. The principle of the invention, however, could be used with a single loading station 54B or with more than two loading stations 54B and 54C. For example, by lengthening conveyor 26, one or more extra loading stations 54D, 54E, etc., can be added. Or, the conveyor 26 could feed to two parallel netters 22 and 22', by having, for example, two stations 54A and 54A', two stations 54B and 54B', etc., so that four workers pack pieces 60 into compartments 38, which then move two increments at a time to load the two netters 22 and 22'.

A frame 62, having legs 64, 66, holds conveyor 26 off the floor of the facility. Frame 62 and legs 64, 66 are shown in FIG. 1 but are omitted, for clarity, in FIGS. 2 and 3. Frame 62 is preferably adjustable or else custom made so that the base 42 of each compartment 38 aligns with the breech 36 of the netter 22 and ram 56, as shown in elevation view in FIG. 3.

For ease of illustration, only compartments 38A, 38B, and 38C are shown in FIG. 2. Ram 56 is shown aligned with compartment 38A at station 38A. Ram 56 has a face plate 68 having a width just slightly less than the space between walls 48, 50. Face plate 68 has a height approximately the same as the height of walls 48, 50. Accordingly, face plate 68 is designed to sweep out space 52 when ram 56 is actuated.

Face plate 68 is attached to cylinder 70. Any method of driving face plate 68 in a reciprocal manner will suffice, such as a rocker arm, a rail system, or a hydraulic piston.

Workers hand-load pieces 60 of whole-muscle meat, parts, and, if appropriate, fat sections, into compartments 38B and 38C, placing the long dimension of the pieces 60 transverse to the direction of travel of the conveyor 26. Preferably, one worker loads the muscles and fat into compartment 38C at station 54C and another worker places and orients the pieces within compartment 38B at station 54B to form composite meat 58. Any other method of dividing the work tasks will suffice. The pieces rest on base 42 and are constrained from lateral movement by walls 48, 50.

When compartment 38B is fill and ready for packaging, belt 28 moves in a counterclockwise direction to move the full compartment 38B to station 54A. A cover 74, preferably actuated by a second cylinder 76, is mounted above conveyor 26. Cover 74 can be mounted on frame 62, can be mounted on netter 22, or can be a separate structure. Cover 74 is designed so that, during the forward and reverse strokes of ram 56, cover 74 seals compartment 38A and breech 36, to keep workers' hands out of the way. Cover 74 can be a vertically-moving piece that descends onto compartment 38 at station 54A, as illustrated in FIG. 3, or cover 74 can be hinged, for example, to netter 22, to rotate from an open position to a closed position. Thus, after conveyor 26 moves to place a fully-loaded compartment 38 at station 54A, cover 74 descends or rotates into its closed position, preventing any contact by workers with any moving parts. After ram 56 has completed its forward and reverse strokes, cover 74 rotates or ascends back to an open position, to allow the now-empty compartment 38 at station 54A to move with conveyor 26 and to allow a now-full compartment 38 to move into station 54A. Any other means to keep workers' hands safe will suffice.

Cylinder 70, which, like second cylinder 76, is coupled to a compressed air source, such as plant air, a compressor, or bottled compressed air, actuates to drive face plate 68, through compartment 38A. PLC 24 prevents operation of cylinder 70 unless cover 74 is closed. Alternatively, proximity switches 77 could be wired to cover 74, to be tripped by contact with a compartment 38, and wired to PLC 24 in a conventional manner to prevent actuation of cylinder 70 unless cover 74 is closed.

When cylinder 70 actuates to drive a forward stroke, the movement of face plate 68 through space 52 pushes the composite meat 58 in compartment 38A out of compartment 38A and into breech 36. Cylinder 70 is designed to have a sufficient stroke to push the meat 58 completely out of compartment 38 and as far into breech 36 as is necessary to operate netter 22. When the meat 58 has been completely moved into breech 36, cylinder 70 retracts, leaving compartment 38A empty. When the workers have completed placing and orienting the pieces in the compartment 38 at station 54B, belt 28 moves again to bring the next full compartment (as illustrated, compartment 38B) to station 54A and in alignment with ram 56 and breech 36.

The belt 28 of conveyor 26 is slightly below the level of breech 36. As a result, bracket 40 holds compartment 38 at the same level as breech 36. Accordingly, ram 56 can push the meat 58 directly into breech 36. The meat 58 does not roll off the end of the conveyor 26 in this system and therefore does not change position or orientation upon leaving the conveyor 26. Rather, since the force applied to the meat 58 is in the direction of travel through netter 22, the pieces 60 maintain their position and orientation relative to each other when pushed into breech 36. Inside breech 36, there is no room for the pieces 60 to change position or orientation. Accordingly, from the time the pieces 60 are placed and oriented at station 54B, they stay in the same position and orientation until meat comes out the distal end 78 of netter 22, wrapped and netted.

When the meat is pushed into breech 36, the wrapping and netting operation begins, as described in the '477 patent to Winkler discussed above, in U. S. patent applications Ser. No. 10/695,115, or in the '297 patent to Kirk, also discussed above, all of which is incorporated by reference. Accordingly, a collagen film (or other wrapping) is applied at film station 80 and netting is applied at netting station 82. Preferably, film station 80 and netting station 82 are one integral unit, netter 22. A wrapped, netted boneless ham (or other meat) will exit at distal end 78, ready for further processing and having a proper placement and orientation of the pieces that make up the ham.

The movements of belt 28, ram 56, and cover 74 are preferably controlled by PLC 24. PLC 24 preferably also controls the operations of netter 22, which works in conjunction with the loader 20. PLC 24 can be programmed to move belt 28 automatically, at predetermined time intervals. For example, a particular time for packing pieces 60 at stations 54B and 54C can be set in PLC 24, so that, after this time interval, belt 28 moves each compartment 38 an increment of one station. Thus, after this predetermined time interval, the compartments 38 illustrated in FIG. 1 will move one station to the left, so that compartment 38A, now empty, begins to rotate under conveyor 26, compartment 38B moves from station 54B to 54A, and compartment 38C moves from station 54C to station 54B. The workers continue to pack at stations 54B and 54C, while rain 56 empties the previously-packed contents of the compartment at station 54A. After the same predetermined time interval, PLC 24 instructs motor 32 to move belt 28 another increment to the left and the process repeats.

Alternatively, a command controller 84 could be used. In this embodiment, when the worker at station 54B determines that the contents of the compartment 38 at that station 54B are ready for wrapping and netting, he or she actuates controller 84, using a push button, foot pedal, voice-actuated controller, or any other suitable device. Upon actuation, controller 84 instructs motor 32 to move belt 28 one increment and the process repeats until the worker actuates controller 84 again.

While a preferred embodiment of the present invention is shown and described, it is envisioned that those skilled in the art may devise various modifications of the present invention without departing from the spirit and scope of the appended claims.

I claim:

1. An apparatus for packaging material, comprising:
   a netter comprising a breech and a film station;
   a conveyor comprising a rotating belt oriented to move transversely to said breech, said belt comprising walls defining a plurality of compartments, said belt aligning a one of said plurality of compartments with said breech as said belt rotates;
   a ram oriented transversely to said conveyor and configured to stroke through said one of said plurality of compartments and through said breech and said film station.

2. The apparatus of claim 1, further comprising a programmed logic controller.

3. The apparatus of claim 1, further comprising a command controller.

4. The apparatus of claim 1, wherein said netter further comprises a netting station distal to said film station and said ram is further configured to stroke through said netting station.

5. The apparatus of claim 1, further comprising a cover configured to seal said one of said plurality of compartments during a stroke of said ram.

6. An apparatus for packaging material, said apparatus comprising:
   a conveyor having a plurality of compartments, said conveyor configured to move each said compartment from at least a first position to a second position, each said compartment configured to receive the material therein at said first position;
   a netter having a breech and a station for packaging the material, at least a portion of said netter being in alignment with said second position; and
   a ram which is in alignment with said second position, said ram configured to stroke into at least each said compartment in said second position in order to cause the material within each said compartment at said second position to be moved out of said compartment, into and through said breech and into said station to be packaged.

7. An apparatus as defined in claim 6, wherein said netter is oriented transversely relative to said conveyor.

8. An apparatus as defined in claim 6, wherein said ram is oriented transversely relative to said conveyor.

9. An apparatus as defined in claim 6, wherein said conveyor comprises a rotating belt comprising walls which define said plurality of compartments, said rotating belt oriented to move transversely relative to said breech.

10. An apparatus as defined in claim 6, wherein said breech is in alignment with said second position, said ram being further configured to stroke into said breech.

11. An apparatus as defined in claim 10, wherein said station is in alignment with said second position, said ram being further configured to stroke into said packaging station.

12. An apparatus as defined in claim 6, wherein said station comprises a film station.

13. An apparatus as defined in claim 12, wherein said station further comprises a netting station, said film station being provided between said breech and said netting station.

14. An apparatus as defined in claim 6, wherein said station comprises a netting station.

15. An apparatus as defined in claim 6, further comprising a programmed logic controller for controlling at least one of said conveyor, said netter and said ram.

16. An apparatus as defined in claim 6, further comprising a command controller for controlling at least one of said conveyor, said netter and said ram.

17. An apparatus as defined in claim 6, further comprising a cover configured to seal each said compartment in said second position during a stroke of said ram.

* * * * *